US011790115B1

(12) United States Patent
Townsend

(10) Patent No.: US 11,790,115 B1
(45) Date of Patent: Oct. 17, 2023

(54) PRIVACY PRESERVING DATA PROCESSING IN A SOLID ECOSYSTEM USING AGENTS

(71) Applicant: Inrupt, Inc., Boston, MA (US)

(72) Inventor: Emmet Townsend, London (GB)

(73) Assignee: Inrupt, Inc., Boston, MA (US)

( * ) Notice: Subject to any disclaimer, the term of this patent is extended or adjusted under 35 U.S.C. 154(b) by 0 days.

(21) Appl. No.: 18/107,414

(22) Filed: Feb. 8, 2023

(51) Int. Cl.
*G06F 21/62* (2013.01)
*G06F 21/33* (2013.01)

(52) U.S. Cl.
CPC .......... *G06F 21/6245* (2013.01); *G06F 21/33* (2013.01)

(58) Field of Classification Search
CPC .............................. G06F 21/6245; G06F 21/33
USPC .......................................................... 726/28
See application file for complete search history.

(56) References Cited

U.S. PATENT DOCUMENTS

| | | | |
|---|---|---|---|
| 11,030,341 B2 | 6/2021 | LaFever et al. | |
| 2012/0066745 A1* | 3/2012 | Wuthnow | H04L 63/10 726/4 |
| 2020/0250295 A1 | 8/2020 | Padmanabhan | |
| 2020/0304507 A1* | 9/2020 | Pandey | G06F 3/0664 |
| 2021/0182423 A1* | 6/2021 | Padmanabhan | G06F 21/6245 |
| 2023/0027253 A1 | 1/2023 | Pastore et al. | |
| 2023/0103518 A1 | 4/2023 | Rogers et al. | |

OTHER PUBLICATIONS

"Beginning Decentralized Identity Applications with Solid," Internet post, Sep. 24, 2021, https://blog.ippon.tech/beginning-decentralized-identity-applications-with-solid/.
"Solid Protocol," Version 0.10.0, Dec. 31, 2022, https://solidproject.org/TR/protocol.
Berners-Lee, "Socially-aware cloud storage," https://www.w3.org/DesignIssues/CloudStorage.html, Sep. 27, 2011.

* cited by examiner

*Primary Examiner* — Jacob Lipman
(74) *Attorney, Agent, or Firm* — David H. Judson

(57) ABSTRACT

A method for privacy preserving data processing in a linked data operating environment wherein applications have secure and permissioned access in an interoperable manner to data that is stored in one or more online data stores. The method begins by creating a privacy preserving data processing (PPDP) agent for use by an entity to process the data in association with the online data stores. The PPDP agent is then subjected to a certification process that ensures that the PPDP agent does not exfiltrate any data from the online data stores. After a successful certification, and following registration of the agent with an agent repository, a secure PPDP environment is instantiated in association with the data stores and in which the PPDP agent is then configured to execute. The PPDP agent is then executed within the secure PPDP environment over a configured security context and life-cycle of the PPDP agent. At the close of the PPDP agent's life-cycle, or upon a given event, the PPDP agent is terminated and the PPDP environment is closed.

20 Claims, 5 Drawing Sheets

PRIVACY PRESERVING DATA PROCESSING IN A SOLID ECOSYSTEM USING AGENTS

BACKGROUND

Technical Field

This disclosure relates generally to technologies, products and services for privacy preserving data processing.

Background of the Related Art

The Solid (Linked Data) Ecosystem ("Solid") is a W3C and industry initiative that provides a set of specification that, together, provide applications with secure and permissioned access to externally stored data in an interoperable way. Solid adds to existing Web standards to provide a space where individuals can maintain their autonomy, control their data and privacy, and choose applications and services to fulfil their needs. To this end, the specifications in the ecosystem describe how Solid servers and clients interoperate by using Web communication protocols, global identifiers, authentication and authorization mechanisms, data formats and shapes, and query interfaces. Participants store their data securely in decentralized data stores called Pods (online data stores), which are akin to personal web servers for data. The notion of "personal" in this context is not limited to a human being, as a Pod may be associated with any person, device, object, organization or thing. Thus, e.g., a Pod may be associated with a human user, a company or government agency, a smart vehicle, an Internet-of-Things (IoT) device, a smart home, or other such construct. When data is stored in a participant's Pod, they control which people and applications can access it. Anyone or anything that accesses data in a Solid Pod can do so in one of two ways: using identity, or using an access grant. Typically, an identity is a unique ID, authenticated by a decentralized protocol (e.g., OpenID Connect). An access grant is akin to a key than can be used to open a vault, and a grant can contain any set of claims including an identity. For example, an access grant with a claim providing that a requesting user is employed by the Post Office (even without proof of the requesting user's identity) may be used to gain access to a resource that is only visible to Post Office employees. Solid's access control system uses identity and/or access grants to determine whether a person or application has access to a resource in a Pod. A Solid Server hosts one or more Solid Pods, and each Pod is fully controlled by the Pod Owner, and each Pod's data and access rules are fully distinct from those of other Pods. With Solid's authentication and authorization protocols, the user determines which people and applications can access the user's data. Solid application store and access data in Pods. Within the interoperable Solid ecosystem, different applications can access the same data instead of requiring separate data silos specifically for the applications.

While the above-described ecosystem provides significant advantages, it is desirable to provide the ability for persons or organizations to create "agents" that can operate on behalf of an entity (e.g., an owner of a Pod, a third party organization, or the like) in the context of a Solid Pod.

BRIEF SUMMARY

This disclosure provides for a method for privacy preserving data processing in a linked data operating environment (e.g., Solid) wherein applications have secure and permissioned access in an interoperable manner to data (e.g., a user's personal data) that is stored in one or more online data stores. The method begins by creating a privacy preserving data processing (PPDP) agent for use by an entity to process the data in association with the one or more online data stores. In a preferred embodiment, the PPDP agent is then subjected to a certification process that ensures that the PPDP agent does not exfiltrate any data from the one or more online data stores. After a successful certification, and following registration of the agent with an agent repository, a secure PPDP environment is instantiated in association with the one or more online data stores and in which the PPDP agent is then configured to execute. The PPDP agent is then executed within the secure PPDP environment over a configured security context and life-cycle of the PPDP agent. At the close of the PPDP agent's life-cycle, or upon a given event, the PPDP agent is terminated and the PPDP environment is closed.

BRIEF DESCRIPTION OF THE DRAWINGS

For a more complete understanding of the disclosed subject matter and the advantages thereof, reference is now made to the following descriptions taken in conjunction with the accompanying drawings, in which.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

DETAILED DESCRIPTION OF AN ILLUSTRATIVE EMBODIMENT

Figure 1:
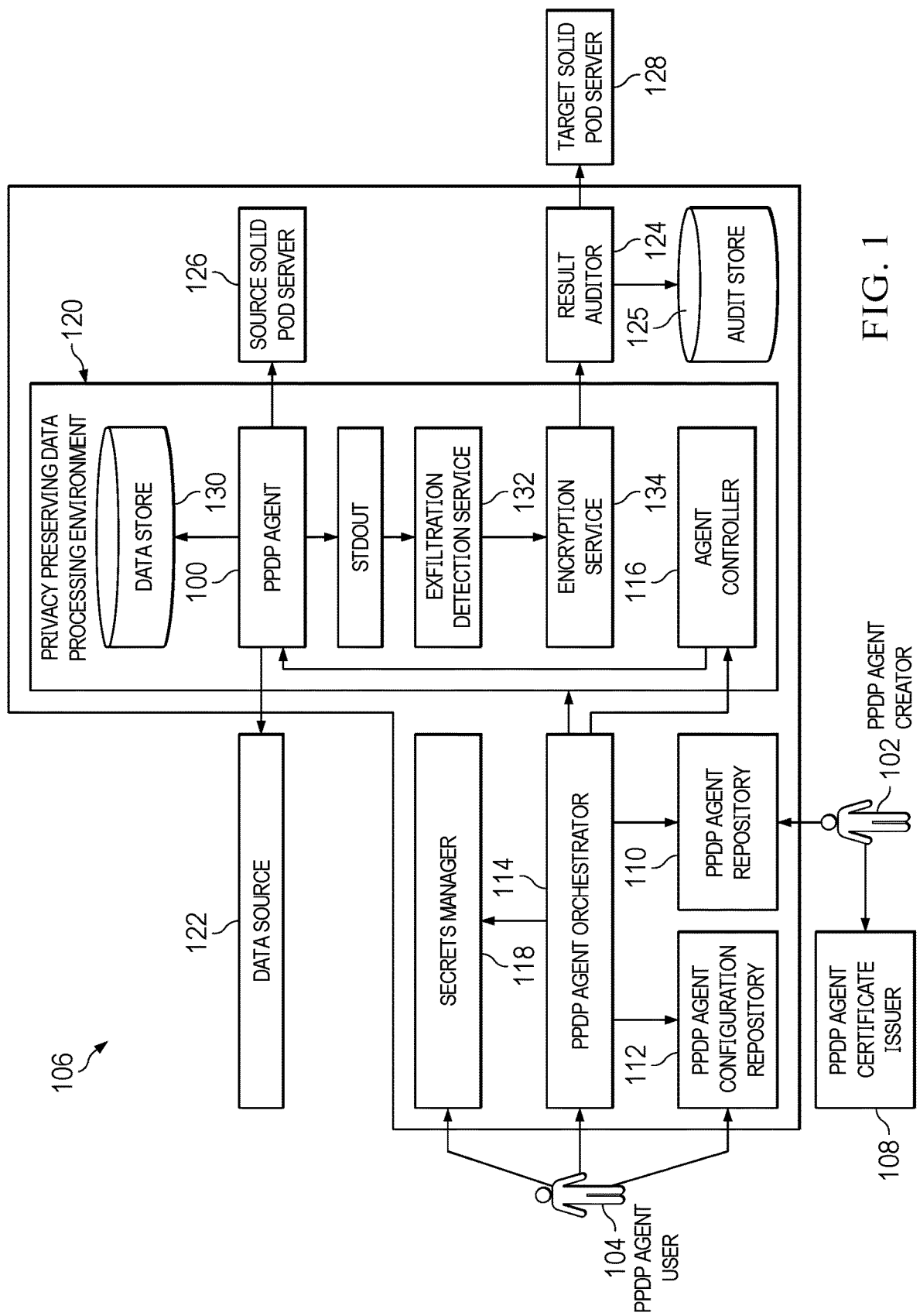
FIG. 1 depicts a representative Solid ecosystem operating environment in which a Privacy Preserving Data Processing (PPDP) Agent is executed within a Privacy Preserving Data Processing (PPDP) Environment according to the techniques of this disclosure.

The reader's familiarity with the Solid Ecosystem is presumed. FIG. 1 depicts a Solid operating environment wherein the techniques of this disclosure are implemented. As used herein, and with reference to FIG. 1, the following terms have the following meaning:

PPDP Agent 100—Privacy Preserving Data Processing Agent

A software program that when activated, executes in the context of one or more Solid Pods. A PPDP Agent executes in the context of any Pod that it has permission to access. The software executes in a secure environment such that the data in the Pod is not decrypted except in the trusted execution environment used by the secure environment. Therefore, the data from the Pod is not exposed to any third party. Typically, the PPDP Agent is configured as a set of special-purpose computer program instructions that are executed by one or more hardware processors in one or more computing systems.

PPDP Agent Creator 102

The person or organization that created the PPDP Agent. The PPDP Agent Creator is responsible for submitting the agent for PPDP Agent Certification.

PPDP Agent User 104

The person or organization that registers the PPDP Agent with the PPDP Agent Repository to act on their behalf. The PPDP Agent User manages the secrets that are provided to the PPDP Agent when it is activated in a PPDP Environment.

PPDP Agent Certification 106

PPDP Agent Certification is a process through which a PPDP Agent goes to ensure it does not exfiltrate any data from a Solid Pod.

PPDP Agent Certificate Issuer (ACI) 108

An organization trusted by the parties in a Solid Ecosystem to carry out the PPDP Agent Certification process and issue certificates.

PPDP Agent Repository 110

A PPDP Agent Repository (AR) is a store for certified PPDP Agents that can be activated to execute in a PPDP Environment. A PPDP Agent registered in a PPDP AR can be associated with a set of Terms. A PPDP AR can be replicated to multiple instances to provide redundancy and/or caching close to PPDP Agent Orchestrators and PPDP Environments. Each unique version of a certified PPDP Agent is only stored once in the PPDP AR.

PPDP Agent Configuration Repository 112

A data store used to maintain the configuration provided by a PPDP Agent User for a PPDP Agent. One certified PPDP Agent in the PPDP AR can be referenced by multiple PPDP Agent Configurations.

PPDP Agent Orchestrator 114

Manages the lifecycle of certified PPDP Agents and PPDP Environments Agent Controller 116

The Agent Controller manages the execution of the PPDP Agent and receives commands from the PPDP Agent Orchestrator.

Secrets Manager 118

Backed by a Hardware Security Module, the Secrets Manager allows the PPDP Agent User to manage the secrets that are provided to the PPDP Agent when it is activated in a PPDP Environment.

PPDP Environment 120

A secure environment in which a PPDP Agent executes. The environment cannot receive incoming network connections. Outbound connections to a Solid Pod Server are allowed but write operations are prevented. Outbound HTTPS connections are allowed to the URIs specified when the executing PPDP Agent was registered with the PPDP Agent Repository and configured in the PPDP Agent Configuration Repository. Preferably, only GET requests are allowed. Standard output from the environment via a standard output device (STDOUT) is written to the Result Audit service. Standard output is a default file descriptor where the process can write output. A PPDP Agent must send its output to the STDOUT.

Data Source 122

A non-Solid HTTP endpoint available over HTTPS that is accessible to the PPDP Agent when executing within a PPDP Environment. Preferably, the endpoint must be specified when the PPDP agent is registered with the PPDP Agent Repository or configured in the PPDP Agent Configuration Repository.

Result Auditor 124

All output from the PPDP Agent is captured and stored by the Result Auditor after being encrypted with an agreed key. The output is also sent to the Pod in the Target Solid Pod Server, specified by the PPDP Agent when it is registered with the PPDP Agent Repository or configured in the PPDP Agent Configuration Repository. Preferably, the results in the Result Auditor can only be decrypted using the agreed key. The decrypted results prove the exact data that was produced by the PPDP Agent. The key management procedure determines which entities are required in order to unlock the key.

Generalizing, the key to decrypt the data can be stored in the secret store, and gaining access to this key may require multiple parties (e.g., using a secret share protocol). That said, there is no requirement that the key used for encryption be the same key that is used for decryption, in which case the decryption key is stored elsewhere, i.e., the decryption key is not available unless it is provided by the PPDP Agent User. In an alternative embodiment, the decryption key can be used by the PPDP Agent User to decrypt the results without ever disclosing the key.

Audit Store 125

A secure data store for the Result Auditor.

Source Solid Pod Server 126

This is the Solid Pod Server the PPDP Agent can read from to get data from Pods. The PPDP Agent must have authorization to read the resources it attempts to access. All supported access methods are permitted including the use of access grants and identity based access.

Target Solid Pod Server 128

This is where the results of the processing are available to the PPDP Agent User. The results are written to the Pod specified by the PPDP Agent when it is configured in the PPDP Agent Configuration Repository.

Data Store 130

A secure data store for the PPDP Agent.

Figure 2:
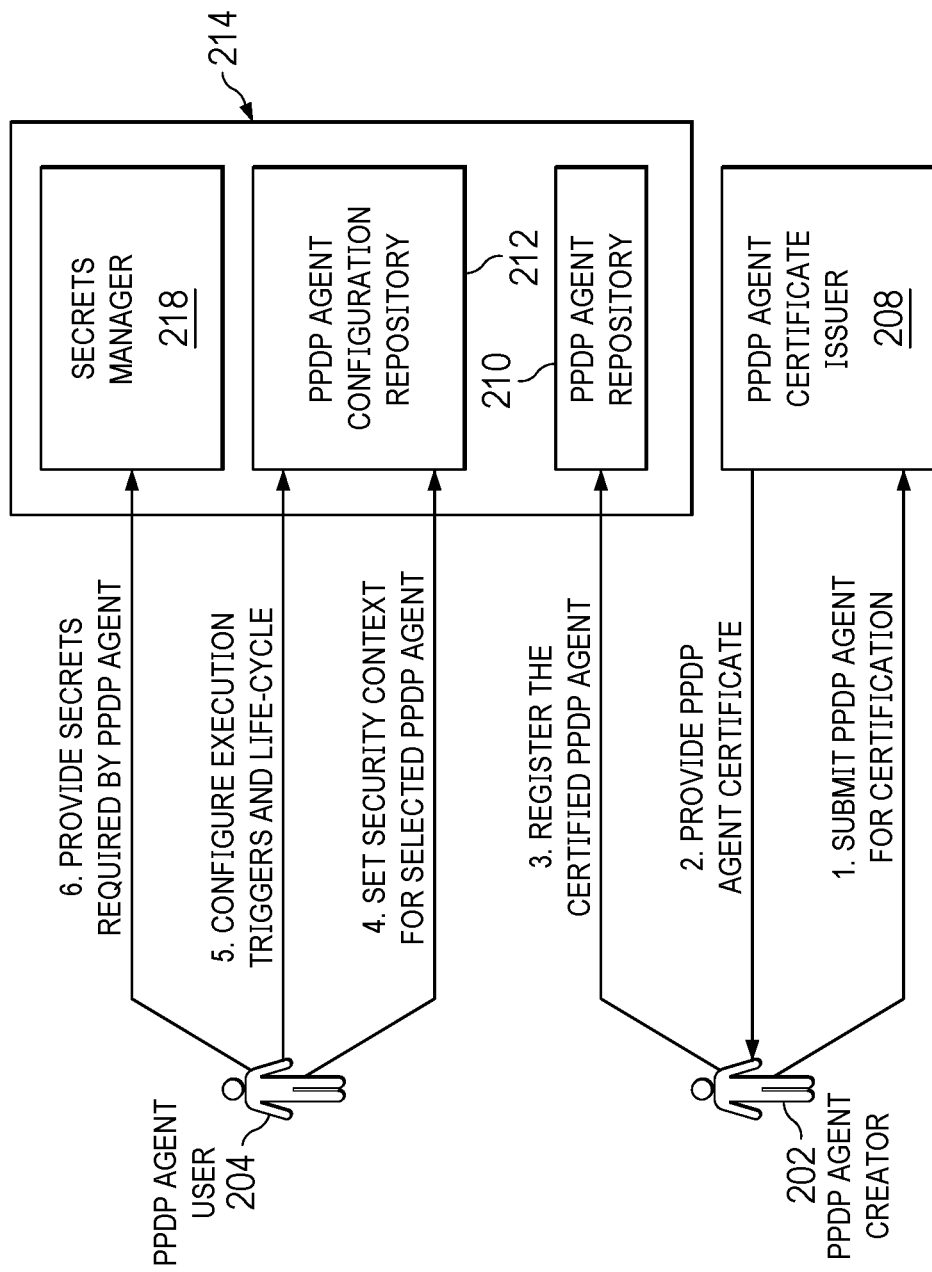
FIG. 2 depicts a process for submitting a PPDP Agent for certification, and how a PPDP Agent user configures a security context and life-cycle of a certified PPDP Agent.

FIG. 2 depicts a setup operation for the PPDP Agent. In the process, the Agent is first certified for use in the PPDP Environment by a PPDP Agent Creator 202; once certified, the PPDP Agent User 204 then configures a security context and life-cycle to enable the PPDP Agent for use in the PPDP Environment. To this end, and at step (1), a PPDP Agent is submitted for certification. In particular, and according to this disclosure, a PPDP Agent must be certified by a recognized PPDP ACI 208 before it can be registered with a PPDP Agent Repository 210. The certification process may include one or more steps. For example, in one step, the PPDP Agent Creator 202 completes and signs a document. This is a legally binding contract between the PPDP Agent Creator and the PPDP ACI where the creator provides guarantees about the type of data processing and the type of data removed from the PPDP Environment. Typically, the PPDP Agent also undergoes static and/or dynamic analysis to identify any potential unauthorized data exfiltration. As a further variant, the PPDP Agent undergoes Artificial Intelligence (AI)-based analysis to identify any potential unauthorized data exfiltration; if the analysis process determines any potential unauthorized data exfiltration by the PPDP Agent, the agent is flagged for inspection by a human. Regardless of which of these steps are used, if the certification process determines the PPDP Agent does not exfiltrate any unauthorized data, a certificate is issued for the PPDP agent at step (2) by the PPDP Agent Certificate Issuer 208. The PPDP Agent Certificate is a Verifiable Credential typically including the following claims and is digitally signed by the PPDP ACI: Issue date, Certification process version, PPDP ACI identifier, PPDP Creator identifier, Expiry date, PPDP Certification Level, PPDP Agent identifier, PPDP Agent version, and PPDP Agent hash.

With reference again to FIG. 2, at step (3), the certified PPDP Agent is registered. This operation involves a PPDP Agent Orchestrator (AO) 214. Preferably, the AO will only use Agents that have been registered with a trusted PPDP Agent Repository (AR) 212. A PPDP AO may be configured to trust multiple PPDP AR in an ecosystem. A PPDP Agent may be registered with multiple different PPDP AR and may use different Terms with each PPDP AR. The PPDP Agent Creator registering a PPDP Agent provides the PPDP AR with information including: PPDP Agent, PPDP Agent Certificate, and PPDP Agent Terms of use that apply to the PPDP Agent User.

Referring back to FIG. 2, at step (4), a security context is set for the PPDP Agent. In particular, preferably, a PPDP Agent User sets the security context for a PPDP Agent before the Agent can be used in a PPDP Environment. The security context can include: a list of data sources the PPDP Agent can read data from (where a data source can be a templated URI containing variables representing secrets from the Secrets Manager); a list of Source Solid Pod Servers the PPDP Agent can read data from (preferably, only read requests are accepted over the connection to any Source Solid Pod Server); a list of Target Solid Pod Servers where the output from the PPDP Agent can be written; and a list of the names of the secrets required by the PPDP Agent. The secrets will be retrieved by the PPDP Agent Orchestrator and made available to the PPDP Agent in the PPDP Environment as environment variables. The list will generally contain at least the credentials to allow the PPDP agent to authenticate with the relevant Identity Provider.

At step (5), one or more execution triggers and life-cycle are configured. The execution triggers determine when the PPDP Agent is executed within the PPDP Environment. Triggers may include: Schedule: a pre-configured schedule determining when the PPDP Agent will be started; and Events: a set of synchronous or asynchronous events that will trigger the starting of the PPDP Agent. The configuration provides the information required to subscribe for the events. Life-cycle is configured as follows. The PPDP Agent Orchestrator 214 can terminate the PPDP Agent at any time. This can be done for reasons including, without limitation, a request by the PPDP Agent User, and operational reasons. The PPDP Agent User can configure what happens when an executing PPDP Agent either completes or crashes. The options include, e.g.: leave the PPDP Environment intact, awaiting another Execute instruction from the PPDP Agent Orchestrator, and terminate the PPDP Environment.

At step (6), secrets required by the PPDP Agent are provided. Typically, all secrets required by the PPDP Agent should be provided by the PPDP Agent User using the Secrets Manager 218. The Secrets Manager must be trusted by the PPDP Agent Orchestrator 214. A PPDP Agent Orchestrator may trust multiple Secrets Managers. This completes the setup process.

Figure 3:
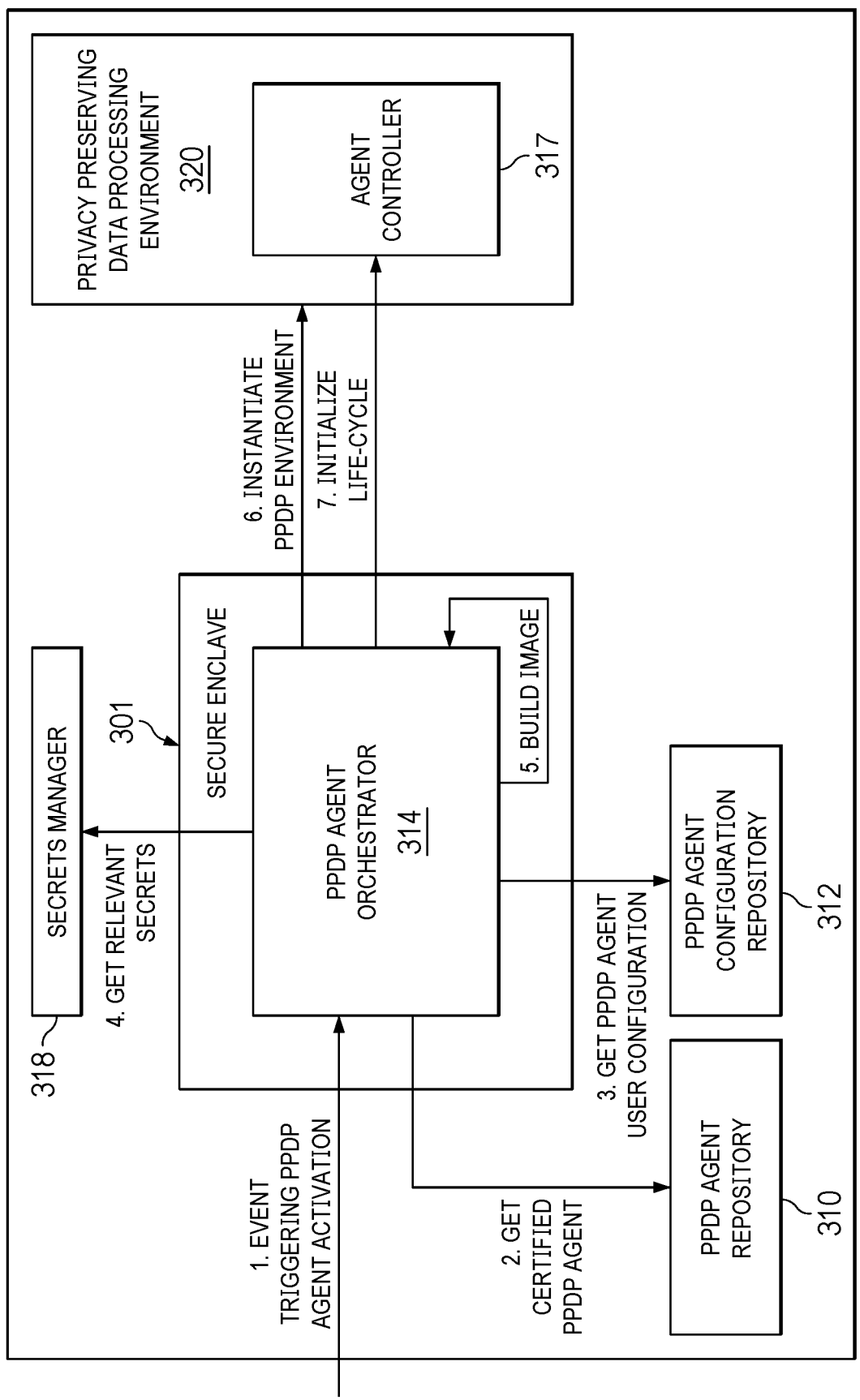
FIG. 3 depicts the activation of the PPDP Environment by a PPDP Agent Orchestrator.

FIG. 3 depicts activation of a PPDP Environment for the certified and configured PPDP Agent. As depicted, the activation is carried out by the PPDP Agent Orchestrator (AO) 314. The PPDP AO must execute within a secure enclave 301. This protects all information processed by the PPDP AO from insider threats and ensures that PPDP Agent User secrets are not disclosed to anybody. The activation process includes a set of steps. At step (1), an event triggering PPDP Agent activation is received. When the PPDP AO 314 receives an activation event for a PPDP Agent User, it begins the process to activate a PPDP Environment 320 for the appropriate PPDP Agent. As noted above, preferably the AO will only use Agents that have been registered with a trusted PPDP Agent Repository (AR) 212. If a PPDP Environment already exists for the PPDP Agent User, then another PPDP Environment will only be activated if the PPDP Agent User has enabled multiple PPDP Environments in the PPDP Agent configuration. At step (2), and in response to the event, the PPDP AO 314 retrieves the certified PPDP Agent from the PPDP Agent Repository 310, verifies the PPDP Agent Certificate, and validates it against the PPDP Agent. If validation succeeds, the process continues at step (3), wherein the PPDP AO 314 retrieves the PPDP Agent configuration from the PPDP Agent Configuration Repository 312. It then validates the PPDP Agent configuration, and the PPDP Agent security context. At step (4), and once the PPDP AO 314 has a validated PPDP Agent and configuration, it will then retrieve all the specified secrets from the Secrets Manager 318. The PPDP AO is executing in a secure enclave, so the secrets are not visible. At step (5), and using the certified PPDP Agent, configuration, security context and secrets, the PPDP AO builds an image appropriate for the underlying trusted execution environment. Examples include, without limitation, AWS® Nitro, Azure® Confidential Computing, and Anjuna® Confidential Computing. At step (6), and once the PPDP Environment image is ready, the PPDP AO creates the secure enclave for the PPDP Environment 320 using the newly created image. At step (7), and once the PPDP Environment 320 is available, the PPDP AO 314 sends a message to the Agent Controller 316 to initialize the environment lifecycle. The PPDP Environment is ready once the Data Store 130, Exfiltration Detection Service 132 and Encryption Service 134 (see FIG. 1) are ready. The Agent Controller 316 will then inform the PPDP AO that the PPDP Environment is in an Activated state.

Figure 4:
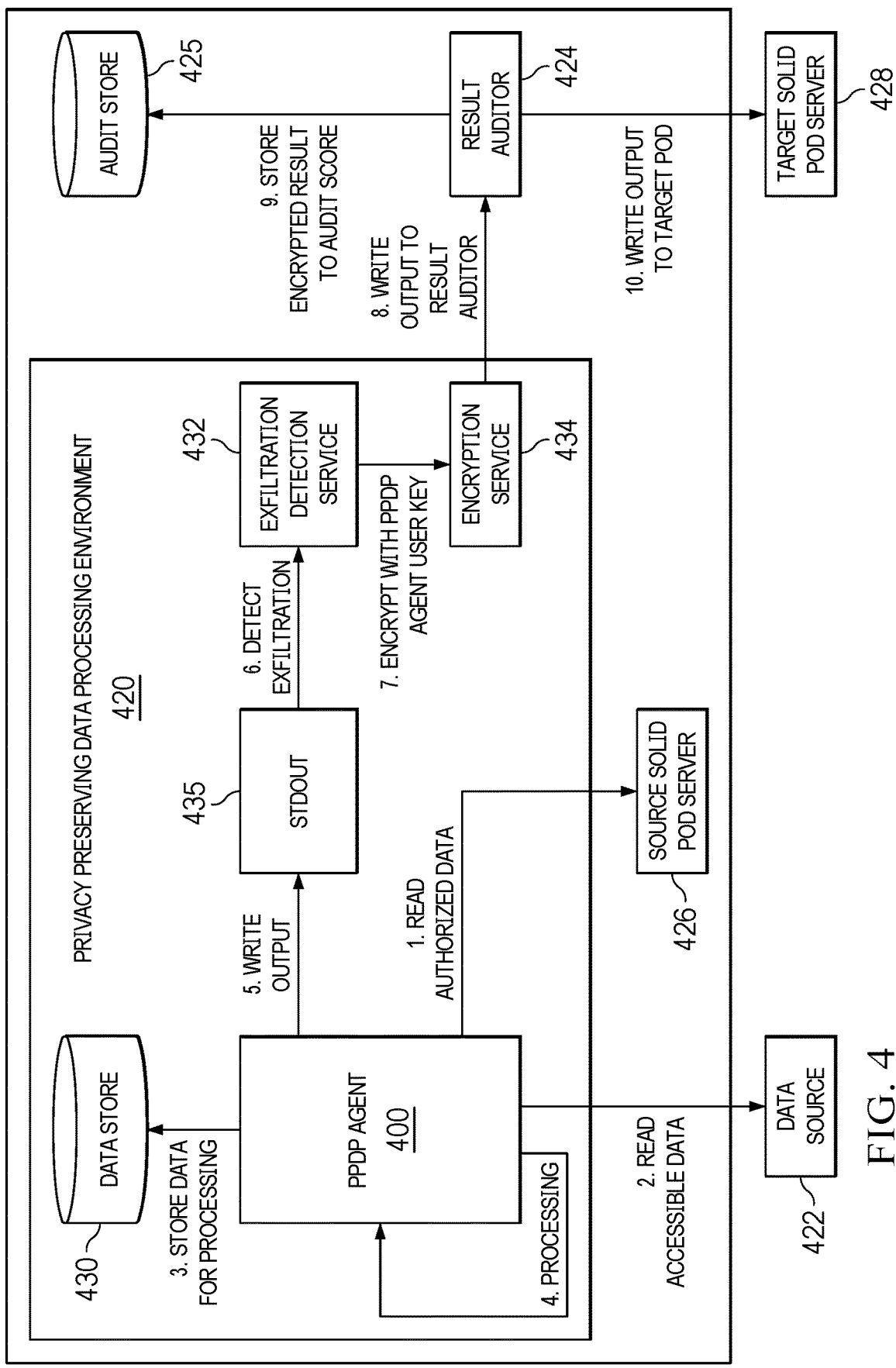
FIG. 4 depicts execution of the PPDP Agent within the PPDP Environment.

FIG. 4 depicts execution of the PPDP Agent within the PPDP Environment. The Agent Controller is responsible for executing the PPDP Agent 400 when it receives an Execute command from the PPDP Agent Orchestrator (AO). The Agent Controller will also provide all the configured secrets in the process environment for the PPDP Agent. Once the PPDP Agent is executing it can do all of the following, as depicted. Operation (1) depicts the PPDP Agent reading authorized data. This operation typically consists of reading data from any of the configured Source Solid Pod Servers (SSPS) 426. The PPDP Agent must be authorized to read the data using any method supported by the SSPS. Examples include: identity-based authorization where the PPDP Agent has authenticated using an identity that has read access to the relevant resources using a mechanism such as Access Control Policies; and Access Grant based authorization where the PPDP Agent possesses one or more Access Grants that can be used to read the relevant resources. The Access Grants can be retrieved from any location the PPDP Agent has permission to access such as an Access Grant Service or a Pod. Operation (2) depicts the PPDP Agent reading accessible data. This operation typically consists of reading data from any of the configured one or more Data Sources 422. The Data Sources may be public or the PPDP Agent may use credentials provided in the environment by the Agent Controller. Operation (3) depicts the PPDP Agent storing data for processing. Data retrieved from the SSPS and Data Sources 422 may be persisted in the Data Store 430. This data will persist for the lifetime of the PPDP Environment. Operation (4) depicts the PPDP Agent processing data in the Data Store 430; PPDP Agent may also store derived data in the Data Store 430. Operation (5) depicts the PPDP Agent writing output data to STDOUT 435. As noted above, by definition the PPDP Agent has no choice but to send its output to the STDOUT, however defined. Any data written to STDOUT 435 goes through several steps including: operation (6), which detects exfiltration. In this operation, all output from the PPDP Agent is scanned for potential personal data exfiltration. If exfiltration is detected, one or more steps can be taken including: stopping the PPDP Agent, informing the PPDP Agent User, informing the Source Solid Pod Provider, informing the owner of the Pod from which the data in question was read, and encrypting the data with the public key for the PPDP AO and sending it to the Result Auditor 424.

Assuming no exfiltration is occurring, operation (7) depicts a data encryption step. At this point, the output data is encrypted by the Encryption Service 434 using the public key provided by the PPDP Agent User. The data is now only accessible by the PPDP Agent User. Operation (8) depicts the resulting encrypted data being written to the Result Auditor 424. Operation (9) depicts storing the encrypted result in the Audit Store 425. In particular, preferably the encrypted data is signed using the private key for the Result Auditor and written to the Audit Store. The Audit Store is used during an investigation if there is a need to prove whether the PPDP Agent exfiltrated data from a Pod. Finally, operation (10) depicts the Result Auditor writing the output to a target Pod 428. This data is encrypted and only accessible to those who have access to the private key provided by the PPDP Agent User.

Figure 5:
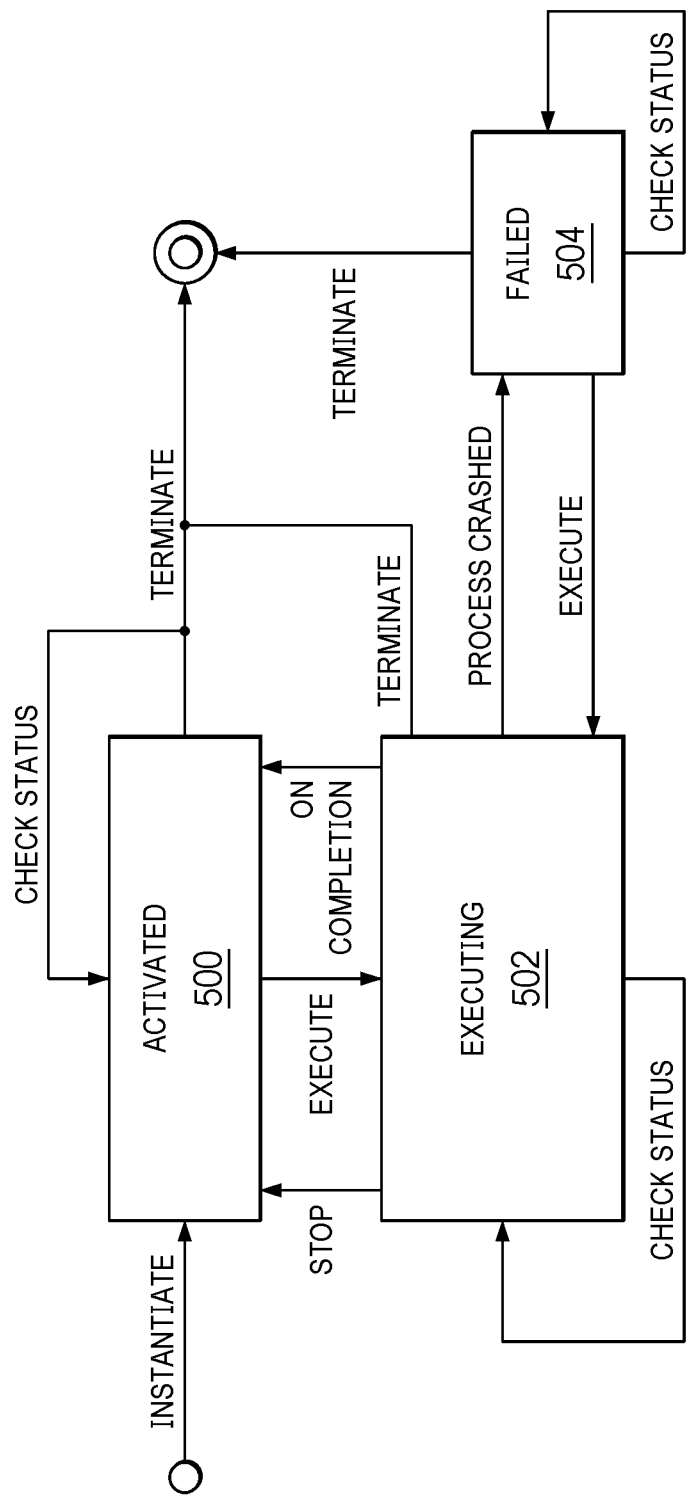
FIG. 5 depicts a representative life-cycle of the PPDP Environment.

FIG. 5 depicts a representative life-cycle of the PPDP Environment. As previously explained, this life-cycle is controlled by the PPDP Agent Orchestrator. The PPDP AO controls the life-cycle of the PPDP Agent by sending commands to the Agent Controller. The commands the Agent Controller can receive from the PPDP AO include: Instantiate, Status, Terminate, Stop and Execute. The Instantiate command resets any Agent Controller state. When the required services are in a ready state, the Environment responds with an Activated status. Upon receipt of the Status command, the Environment responds with the current state; as depicted in FIG. 5, the valid states include: Activated 500 (the environment is ready to execute the PPDP Agent), Executing 502 (the PPDP Agent is currently executing), and Failed 504 (the PPDP Agent failed during a last execution attempt. The Terminate command stops the PPDP Agent if it is executing and removes the PPDP Environment. All data in the Data Store is then lost. The Stop command kills the PPDP Agent process if it is currently executing. The PPDP Environment remains intact and the status is reset to Activated. The Execute command operates as follows. If the current status is Activated, then execute the PPDP Agent and set the status to Executing. If the current status is Failed, then reset the environment to an Activated status and then perform the Execute command. When the PPDP Agent is executing, the Agent Controller monitors status of the process. If the process exits successfully then the environment status is set to Activated; if the process crashes, then the environment status is set to Failed; if the Agent Controller determines that the PPDP agent is a rogue process, it will kill the process and set the status to Failed.

Enabling Technologies

As noted above, the techniques herein are carried out in association with a Solid ecosystem. According to the Solid Protocol, a data pod is a place for storing resources, with mechanisms for controlling who can access what. A Solid application (app) is an application that reads or writes data from one or more storages. A Uniform Resource Identifier (URI) provides the means for identifying resources. A resource is the target of an HTTP request identified by a URI. A container resource is a hierarchical collection of resources that contains other resources, including containers. A root container is a container resource that is at the highest level of the collection hierarchy. Resource metadata encompasses data about resources described by means of RDF statements. An agent is a person, social entity, or software identified by a URI; e.g., a WebID denotes an agent. An owner is a person or a social entity that is considered to have the rights and responsibilities of a data storage. An owner is identified by a URI, and implicitly has control over all data in a storage. An owner is first set at storage provisioning time and can be changed. An origin indicates where an HTTP request originates from. A read operation entails that information about a resource's existence or its description can be known. A write operation entails that information about resources can be created or removed. An append operation entails that information can be added but not removed.

Generalizing, one or more functions of the above-described system may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

More generally, the Solid Ecosystem comprises a set of one or more computing-related entities (systems, machines, processes, programs, libraries, functions, or the like) that together facilitate or provide the functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The described commercial products, systems and services are provided for illustrative purposes only and are not intended to limit the scope of this disclosure.

The techniques herein provide for improvements to technology or technical field, as well as improvements to various technologies, all as described.

In an alternative embodiment, an Agent is configured to self-certify, or an Agent may arrive into to the system pre-certified by a trusted third party or with a digital signature or the like that indicates that the creator of the Agent is implicitly trusted.

Having described the subject matter, what is claimed is as follows:

1. A method for privacy preserving data processing in a linked data operating environment wherein applications have secure and permissioned access in an interoperable manner to data that is stored in one or more online data stores, comprising:
   creating a privacy preserving data processing (PPDP) agent for use by an entity to process the data in association with the one or more online data stores;
   instantiating a secure PPDP environment in association with the one or more online data stores and in which the PPDP agent is configured to execute; and
   executing the PPDP agent within the secure PPDP environment over a configured security context and life-cycle of the PPDP agent.

2. The method as described in claim 1 wherein the PPDP environment is restricted from receiving inbound network connections.

3. The method as described in claim 1 wherein the PPDP environment is allowed to make outbound connections to a server associated with the linked data operating environment but cannot write to the server.

4. The method as described in claim 1 wherein the PPDP environment is allowed to make outbound HTTPS connections to one or more URIs that are specified when the PPDP agent is registered with an agent repository following certification of the agent or configured in a configuration repository.

5. The method as described in claim 1 wherein the executing PPDP agent accesses data from a data source that is an HTTP endpoint that is unassociated with the linked data operating environment, the data source having been specified when the PPDP agent is registered with an agent repository or configured in a configuration repository.

6. The method as described in claim 1 further including terminating the PPDP agent and closing the PPDP environment.

7. The method as described in claim 1 wherein the linked data operating environment is Solid.

8. The method as described in claim 1 further including:
   certifying the PPDP agent; and
   instantiating the secure PPDP environment following certification of the PPDP agent.

9. The method as described in claim 8 wherein certifying the PPDP agent includes:
   receiving, by a PPDP agent certificate issuer, the PPDP agent; and
   performing one or more certification operations, wherein at least one certification operation attempts to identify any potential unauthorized data exfiltration by the PPDP agent;
   if the PPDP agent passes the one or more certification operations, issuing a certificate to a PPDP agent user.

10. The method as described in claim 9 wherein the certificate is a verifiable credential that verifies that the PPDP agent is a certified PPDP agent.

11. The method as described in claim 10 further including registering the certified PPDP agent.

12. The method as described in claim 11 further including establishing a security context for the PPDP agent.

13. The method as described in claim 11 further including configuring one or more execution triggers for the certified PPDP agent, wherein a given execution trigger determines when the PPDP agent is executed within the PPDP environment.

14. The method as described in claim 11 further including configuring a life-cycle for the certified PPDP agent.

15. The method as described in claim 10 wherein instantiating the secure PPDP environment includes:
   receiving an activation event for a PPDP agent user;
   responsive to the receipt of the activation event, retrieving the certified PPDP agent, a PPDP agent user configuration, and one or more secrets;
   using the certified PPDP agent, user configuration, and the one or more secrets, generating an image; and
   instantiating the image.

16. The method as described in claim 15 further including initializing the PPDP environment according to a configured life-cycle.

17. The method as described in claim 1 wherein the executing the PPDP agent includes at least one of: reading authorized data from the one or more online data stores, reading accessible data from one or more data sources, storing the authorized data or the accessible data, processing the authorized data or the accessible data, and writing an output that results from any such processing.

18. The method as described in claim 17 further including encrypting an output generated by the PPDP processing agent.

19. A Software-as-a-Service computing platform, comprising:
   computing hardware;

computer software executing on the computer hardware, the computer software comprising program code executed on the computing hardware to provide privacy preserving data processing in a linked data operating environment wherein applications have secure and permissioned access in an interoperable manner to data that is stored in one or more online data stores, the program code configured to:

create a privacy preserving data processing (PPDP) agent for use by an entity to process the data in association with the one or more online data stores;

instantiate a secure PPDP environment in association with the one or more online data stores and in which the PPDP agent is configured to execute; and execute the PPDP agent within the secure PPDP environment over a configured security context and life-cycle of the PPDP agent.

20. A computer program product in a non-transitory computer-readable medium, the computer program product comprising program code executable by one or more hardware processors to provide privacy preserving data processing in a linked data operating environment wherein applications have secure and permissioned access in an interoperable manner to data that is stored in one or more online data stores, the program code configured to:

create a privacy preserving data processing (PPDP) agent for use by an entity to process the data in association with the one or more online data stores;

instantiate a secure PPDP environment in association with the one or more online data stores and in which the PPDP agent is configured to execute; and execute the PPDP agent within the secure PPDP environment over a configured security context and life-cycle of the PPDP agent.

* * * * *